United States Patent
Baek et al.

(10) Patent No.: US 9,665,739 B2
(45) Date of Patent: May 30, 2017

(54) DISPLAY DEVICE HAVING SECURITY FUNCTION

(71) Applicant: Samsung Display Co., LTD., Yongin, Gyeonggi-Do (KR)

(72) Inventors: Yun-Ki Baek, Suwon-si (KR); Ho-Seok Son, Anyang-si (KR); Joon-Chul Goh, Hwaseong-si (KR); Mun-San Park, Hwaseong-si (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 0 days.

(21) Appl. No.: 14/626,558

(22) Filed: Feb. 19, 2015

(65) Prior Publication Data

US 2016/0078254 A1    Mar. 17, 2016

(30) Foreign Application Priority Data

Sep. 12, 2014  (KR) ........................ 10-2014-0121086

(51) Int. Cl.
*G06F 21/00* (2013.01)
*G06F 21/84* (2013.01)
*G06F 21/44* (2013.01)

(52) U.S. Cl.
CPC .............. *G06F 21/84* (2013.01); *G06F 21/44* (2013.01)

(58) Field of Classification Search
None
See application file for complete search history.

(56) References Cited

U.S. PATENT DOCUMENTS 6,216,173 B1 *   4/2001   Jones ..................... G06F 9/4812
                                                        709/202
8,271,618 B1 *   9/2012   Kridlo ..................... H04L 67/06
                                                        709/219

(Continued)

FOREIGN PATENT DOCUMENTS

KR    1020020050774 A    6/2002
KR    1020080033038 A    4/2008
KR    1020100075123 A    7/2010

OTHER PUBLICATIONS

Ryutov, Tatyana; Newman, Clifford. The Specification and Enforcement of Advanced Security Policies. Proceedings, Third International Workshop on Policies for Distributed Systems and Networks, 2002. http://ieeexplore.ieee.org/stamp/stamp.jsp?arnumber=1011300.*

(Continued)

*Primary Examiner* — Jeremiah Avery
(74) *Attorney, Agent, or Firm* — Robert E. Bushnell, Esq.

(57) ABSTRACT

Display device includes timing controller, display panel, data driver, and scan driver. The timing controller includes an authentication processing unit configured to generate an authentication result based on an authentication control signal. The timing controller converts an input image data signal to data driver control signal and scan driver control signal when the authentication result represents success. The timing controller deactivates the data driver control signal and the scan driver control signal when the authentication result represents fail. The display panel includes plurality of pixels. The data driver generates plurality of data signals based on the data driver control signal and provides the data signals to the pixels through plurality of data signal lines. The scan driver generates plurality of scan signals based on the scan driver control signal and provides the scan signals to the pixels through plurality of scan signals lines.

7 Claims, 7 Drawing Sheets

(56) References Cited

U.S. PATENT DOCUMENTS

| | | | | |
|---|---|---|---|---|
| 8,695,068 B1* | 4/2014 | Etchegoyen | G06F 21/00 | |
| | | | 345/419 | |
| 2001/0047393 A1* | 11/2001 | Arner | G06F 9/4445 | |
| | | | 709/216 | |
| 2002/0058497 A1 | 5/2002 | Jeong | | |
| 2003/0055962 A1* | 3/2003 | Freund | H04L 63/0263 | |
| | | | 709/225 | |
| 2005/0010649 A1* | 1/2005 | Payne | G08B 13/19656 | |
| | | | 709/217 | |
| 2007/0005988 A1* | 1/2007 | Zhang | G06F 21/32 | |
| | | | 713/186 | |
| 2008/0084432 A1 | 4/2008 | Jeon | | |
| 2008/0098212 A1* | 4/2008 | Helms | H04L 63/0428 | |
| | | | 713/155 | |
| 2009/0132805 A1* | 5/2009 | Ginter | G06F 21/10 | |
| | | | 713/150 | |
| 2010/0107225 A1* | 4/2010 | Spencer | H04L 63/0876 | |
| | | | 726/4 | |
| 2010/0156949 A1 | 6/2010 | Park et al. | | |
| 2010/0277505 A1 | 11/2010 | Ludden et al. | | |
| 2012/0131353 A1* | 5/2012 | Nasir | G06F 21/42 | |
| | | | 713/189 | |
| 2014/0157349 A1* | 6/2014 | Robinson | G06K 9/00228 | |
| | | | 726/1 | |
| 2014/0364084 A1* | 12/2014 | Tomikawa | H04M 15/67 | |
| | | | 455/408 | |

OTHER PUBLICATIONS

Kolias, Constantinos; Kambourakis, Georgios; Gritzalis, Stefanos. Attacks and Countermeasures on 802.16: Analysis and Assessment. IEEE Communications Surveys & Tutorials vol. 15, Issue: 1. Pub. Date: 2013. http://ieeexplore.ieee.org/stamp/stamp.jsp?arnumber=6170531.*

* cited by examiner

DISPLAY DEVICE HAVING SECURITY FUNCTION

CROSS-REFERENCE TO RELATED APPLICATION

This application claims priority under 35 USC §119 to Korean Patent Applications No. 10-2014-0121086, filed on Sep. 12, 2014 in the Korean Intellectual Property Office (KIPO), the contents of which are incorporated herein in its entirety by reference.

BACKGROUND

Technical Field

Example embodiments relate generally to a display device. More particularly, embodiments of the invention relate to a display device having security function.

Description of the Related Art

Recently, smartphone, laptop, and other mobile electronic devices include a display device generally. Because most of the mobile electronic devices are expensive, they are easy to be stolen. The mobile electronic device may include a display device and a board including an application processor. The board of the stolen mobile electronic device may not be easily reused because of the complexity. However, the display device may be easily reused because complexity of the display device is not too high, and there is no authentication procedure when the display device displays an input image data signal provided from the board. The display device having security (authentication) function to prevent illegal reuse of the display device is necessary.

SUMMARY

Some example embodiments provide a display device having authentication procedure with the application processor to prevent illegal reuse of the display device.

According to example embodiments, a display device includes a timing controller, a display panel, a data driver, and a scan driver. The timing controller includes an authentication processing unit to generate an authentication result based on an authentication control signal. The timing controller converts an input image data signal to a data driver control signal and a scan driver control signal when the authentication result represents success. The timing controller deactivates the data driver control signal and the scan driver control signal when the authentication result represents fail. The display panel includes a plurality of pixels. The data driver generates a plurality of data signals based on the data driver control signal and provides the data signals to the pixels through a plurality of data signal lines. The scan driver generates a plurality of scan signals based on the scan driver control signal and provides the scan signals to the pixels through a plurality of scan signals lines.

In an example embodiment, the timing controller may include an image processing unit and a switching unit. The image processing unit may output an image result as a first control signal and a second control signal. The image result may be processed from the input image data signal. The first control signal may control the data driver. The second control signal may control the scan driver. The switching unit may have a first multiplexer and a second multiplexer. The first multiplexer may output the first control signal or a deactivation logic value as the data driver control signal in response to the authentication result. The second multiplexer may output the second control signal or the deactivation logic value as the scan driver control signal in response to the authentication result.

In an example embodiment, the authentication processing unit may include a first register and a second register. The first register may store the authentication control signal. The second register may store an authentication reference value.

In an example embodiment, the authentication processing unit may generate the authentication result representing success when an output of the first register is equal to the authentication reference value. The authentication processing unit may generate the authentication result representing fail when the output of the first register is different from the authentication reference value.

In an example embodiment, the authentication processing unit may include a first register and a second register. The first register may store the authentication control signal. The second register may store a sequence of authentication reference values.

In an example embodiment, the authentication processing unit may generates the authentication result representing success from the time point at which a sequence of outputs of the first register becomes equal to the sequence of the authentication reference values.

In an example embodiment, the application processor may generate the authentication control signal and the input image data signal.

In an example embodiment, the application processor may insert an authentication reference value or a sequence of authentication reference values to the authentication control signal during a booting operation of an operating system.

In an example embodiment, the application processor may insert an authentication reference value or a sequence of authentication reference values to the authentication control signal during a normal operation of an operating system and the normal operation is after an booting operation of the operating system.

In an example embodiment, the application processor may insert the authentication reference value or the sequence of the authentication reference values to the authentication control signal during the normal operation periodically.

In an example embodiment, the application processor may insert the authentication reference value or the sequence of the authentication reference values to the authentication control signal during the normal operation in response to a request of user.

According to example embodiments, a display device includes an authentication processor, a timing controller, a display panel, a data driver, and a scan driver. The authentication processor generates an authentication result based on an authentication control signal. The timing controller converts an input image data signal to a data driver control signal and a scan driver control signal when the authentication result represents success. The timing controller deactivates the data driver control signal and the scan driver control signal when the authentication result represents fail. The display panel includes a plurality of pixels. The data driver generates a plurality of data signals based on the data driver control signal, and provides the data signals to the pixels through a plurality of data signal lines. The scan driver generates a plurality of scan signals based on the scan driver control signal, and provides the scan signals to the pixels through a plurality of scan signal lines.

In an example embodiment, the timing controller may include an image processing unit and a switching unit. The image processing unit may output an image result as a first control signal and a second control signal. The image result may be processed from the input image data signal. The first control signal may control the data driver. The second control signal may control the scan driver. The switching unit may include a first multiplexer and a second multiplexer. The first multiplexer may output the first control signal or a deactivation logic value as the data driver control signal in response to the authentication result. The second multiplexer may output the second control signal or the deactivation logic value as the scan driver control signal in response to the authentication result.

In an example embodiment, the authentication processor may include a first register and a second register. The first register may store the authentication control signal. The second register may store an authentication reference value.

In an example embodiment, the authentication processor may generate the authentication result representing success when an output of the first register is equal to the authentication reference value. The authentication processor may generate the authentication result representing fail when the output of the first register is different from the authentication reference value.

In an example embodiment, an application processor may generate the authentication control signal and the input image data signal.

As described above, the display device according to example embodiments may prevent illegal reuse of the display device through an authentication function between the application processor and the display device.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
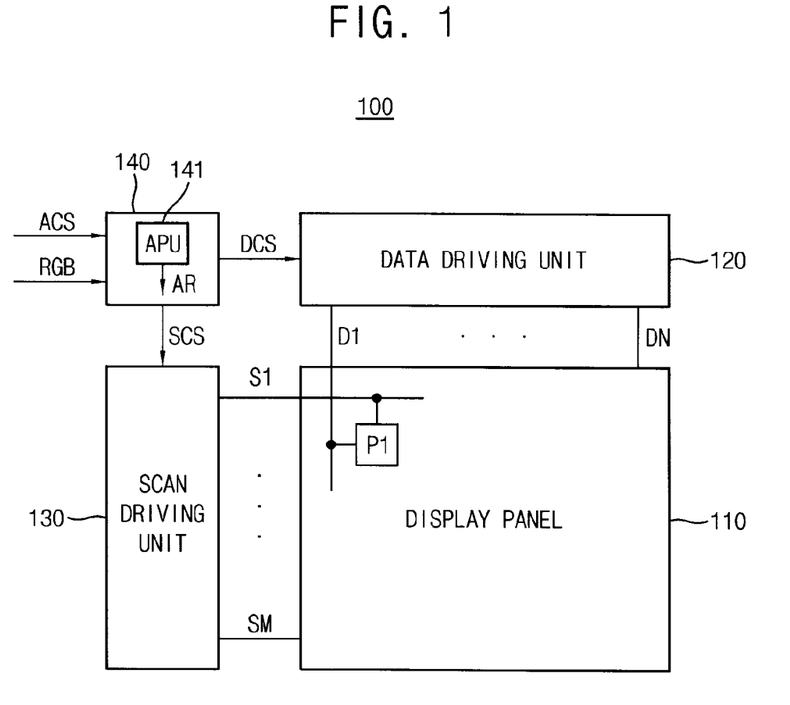
FIG. 1 is a block diagram illustrating a display device according to an example embodiment.

FIG. 1 is a block diagram illustrating a display device according to an example embodiment.

Referring to FIG. 1, a display device 100 includes a timing controller 140, a display panel 110, a data driver 120, and a scan driver 130. The timing controller 140 includes an authentication processing unit 141 configured to generate an authentication result AR based on an authentication control signal ACS. The timing controller 140 converts an input image data signal RGB to a data driver control signal DCS and a scan driver control signal SCS when the authentication result AR represents success. The timing controller 140 deactivates the data driver control signal DCS and the scan driver control signal SCS when the authentication result AR represents fail. When the authentication result AR represents fail, the display panel 110 may not display any image. Structure and operation of the timing controller 140 will be described with the references to FIGS. 2 through 8.

The display panel 110 includes a plurality of pixels P1. The data driver 120 generates a plurality of data signals based on the data driver control signal DCS and provides the data signals to the pixels P1 through a plurality of data signal lines D1 through DN. The scan driver 130 generates a plurality of scan signals based on the scan driver control signal SCS and provides the scan signals to the pixels P1 through a plurality of scan signals lines S1 through SM. The authentication control signal ACS and the input image data signal RGB may be generated from an external application processor.

Figure 2:
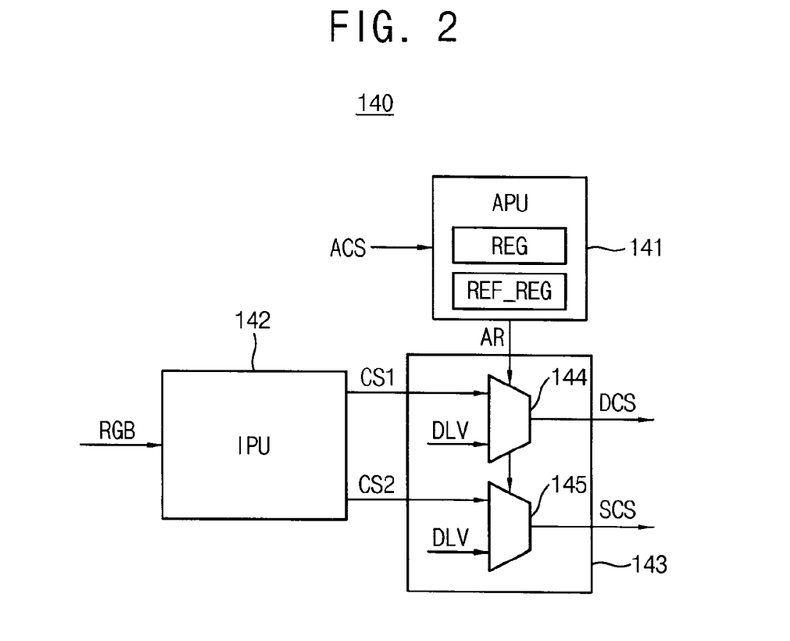
FIG. 2 is a block diagram illustrating the timing controller included in the display device of FIG. 1.

FIG. 2 is a block diagram illustrating the timing controller included in the display device of FIG. 1.

Referring to FIG. 2, the timing controller 140 may include an authentication processing unit 141, an image processing unit 142, and a switching unit 143.

The authentication processing unit 141 may include a first register REG and a second register REF_REG. The first register REG may store the authentication control signal ACS. The second register REF_REG may store an authentication reference value or a sequence of authentication reference values.

The authentication processing unit 141 may generate an authentication result AR based on an authentication control signal ACS. In detail, the authentication processing unit 141 may generate the authentication result AR representing success SUCCESS or fail FAIL by comparing output REG_OUT of the first register REG and the authentication reference value or the sequence of the authentication reference values which are stored in the second register REF_REG. An example embodiment that the authentication processing unit 141 generates the authentication result AR by comparing output REG_OUT of the first register REG and the authentication reference value stored in the second register REF_REG will be described with the reference to FIG. 3. Another example embodiment that the authentication processing unit 141 generates the authentication result AR by comparing output REG_OUT of the first register REG and the sequence of the authentication reference values stored in the second register REF_REG. will be described with the references to FIGS. 4 and 5.

The image processing unit 142 may output an image result as a first control signal CS1 and a second control signal CS2. The image result may be processed from the input image data signal RGB. The first control signal CS1 may control the data driver 120. The second control signal CS2 may control the scan driver 130. In an example embodiment, the image processing may be a gamma compensation. In another example embodiment, the image processing may be a color gain compensation. In still another example embodiment, the image processing may be a hue compensation.

The switching unit 143 may have a first multiplexer 144 and a second multiplexer 145. The first control signal CS1 and a deactivation logic value DLV are input to the first multiplexer 144, and the first multiplexer 144 may output the first control signal CS1 or a deactivation logic value DLV as the data driver control signal DCS in response to the authentication result AR. The second control signal CS2 and a deactivation logic value DLV are input to the second multiplexer 145, and the second multiplexer 145 may output the second control signal CS2 or the deactivation logic value DLV as the scan driver control signal SCS in response to the authentication result AR. In an example embodiment, the deactivation logic level DLV may be a logical value 0. In another example embodiment, the deactivation logic level DLV may be a logical value 1.

In detail, the first multiplexer 144 may output the first control signal CS1 as the data driver control signal DCS when the authentication result AR represents success. The first multiplexer 144 may output the deactivation logic value DLV as the data driver control signal DCS when the authentication result AR represents fail. The second multiplexer 145 may output the second control signal CS2 as the scan driver control signal SCS when the authentication result AR represents success. The second multiplexer 145 may output the deactivation logic value DLV as the scan driver control signal SCS when the authentication result AR represents fail.

Figure 3:
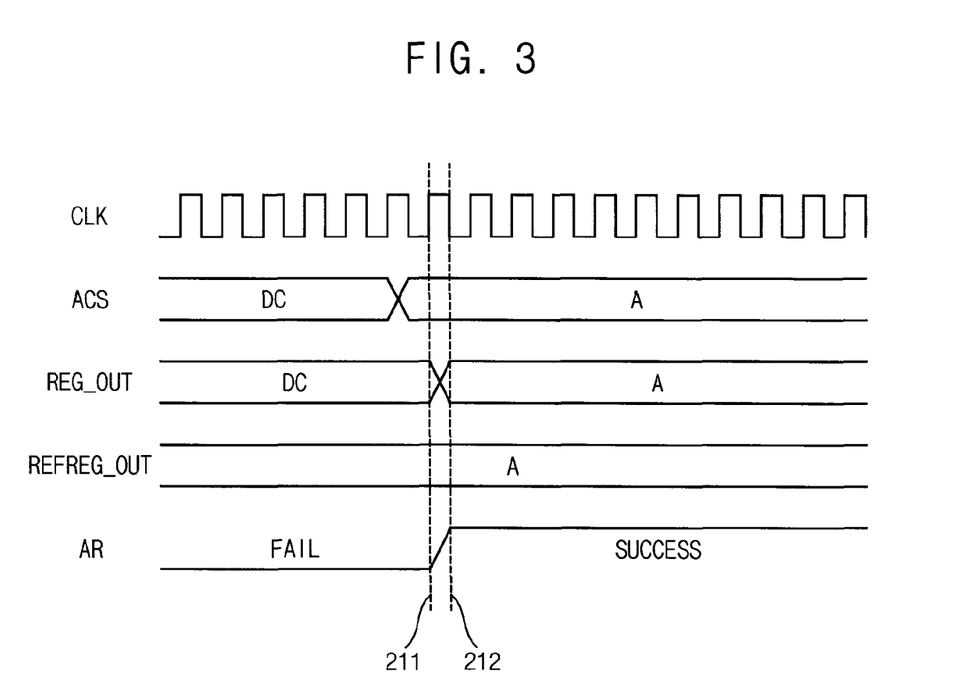
FIGS. 3 through 5 are timing diagrams illustrating example embodiments of operation of the authentication processing unit included in the timing controller of FIG. 2.
Figure 4:
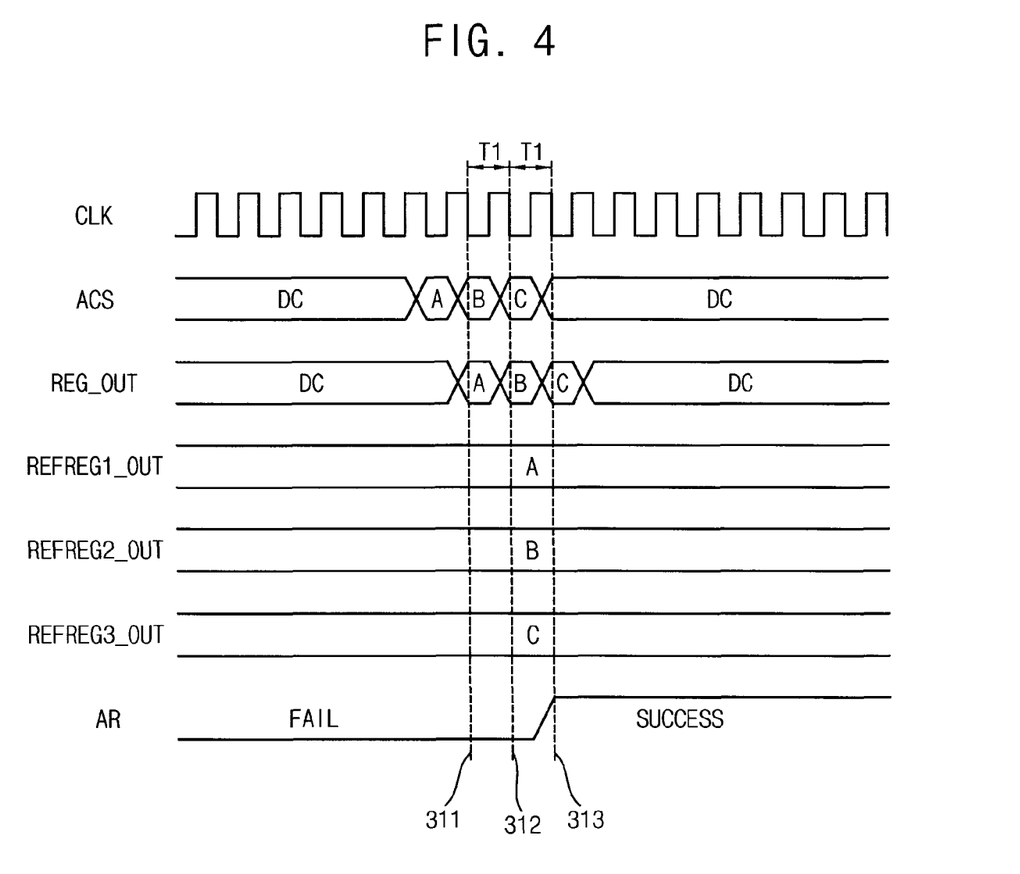
Figure 5:
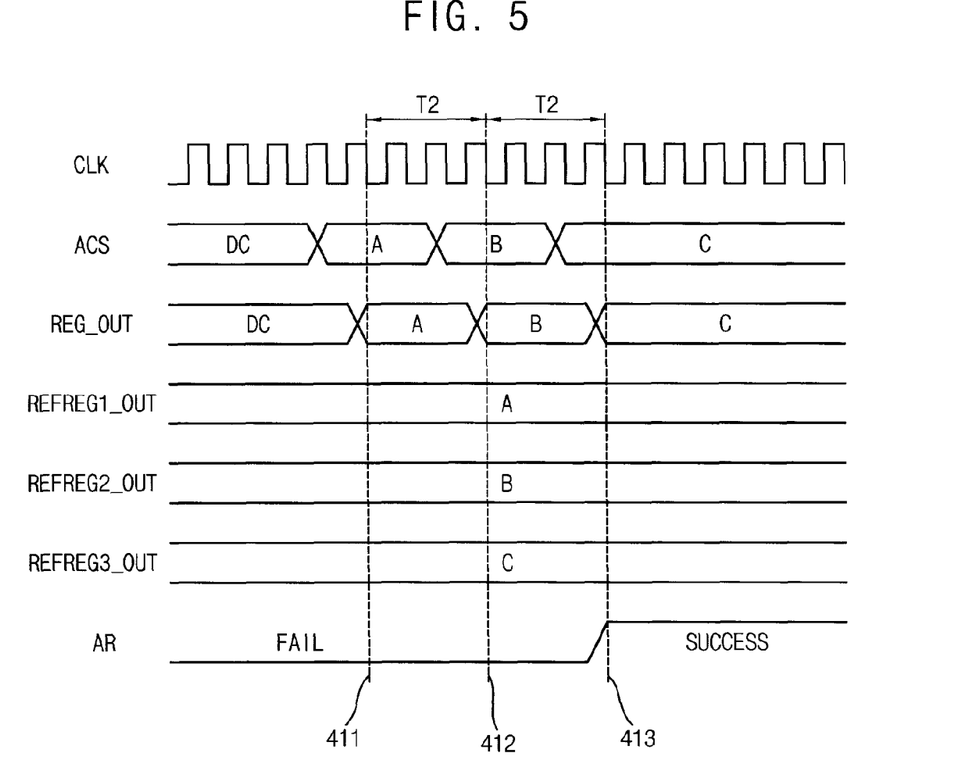

FIGS. 3 through 5 are timing diagrams illustrating example embodiments of operation of the authentication processing unit included in the timing controller of FIG. 2.

FIG. 3 shows operation of the authentication processing unit 141 when the second register REF_REG includes an authentication reference value.

The authentication processing unit 141 may generate the authentication result AR representing success SUCCESS when an output REG_OUT of the first register REG is equal to the authentication reference value. The authentication processing unit 141 may generates the authentication result AR representing fail FAIL when the output REG_OUT of the first register REG is different from the authentication reference value.

In detail, from a first time point 211 to a second time point 212, stored value of the first register REG is changed to 'A', which is a value of the authentication control signal ACS. Because the output REG_OUT of the first register REG, which is "DC" before the first time point 211, is different from the stored value REFREG_OUT of the second register REF_REG, which is 'A', before the first time point 211, the authentication processing unit 141 outputs logic value 0 representing fail FAIL as the authentication result AR. Because the output REG_OUT of the first register REG becomes 'A' that is equal to the stored value REFREG_OUT of the second register REF_REG after the second time point 212, the authentication processing unit 141 outputs logic value 1 representing success SUCCESS as the authentication result AR.

FIG. 4 shows an example operation of the authentication processing unit 141 when the second register REF_REG includes a sequence of authentication reference values. FIG. 4 shows the case that the sequence of the authentication reference values is "A, B, C" and the second register REF_REG includes a plurality of registers, which can be referred to as the third register, the fourth register, and the fifth register. FIG. 4 assumes that an output REFREG1_OUT of the third register is initialized as 'A', which is a first value in the sequence of the authentication reference values, and an output REFREG2_OUT of the fourth register is initialized as 'B', which is a second value in the sequence of the authentication reference values, and an output REFREG3_OUT of the fifth register is initialized as 'C', which is a third value in the sequence of the authentication reference values.

The output REG_OUT of the first register REG is changed to A at the first time point 311. The authentication processing unit 141 checks whether the output REG_OUT of the first register REG is equal to the output REFREG1_OUT of the third register at the first time point 311. The output REG_OUT of the first register REG may be maintained as 'A' during a first period T1 of the clock signal CLK.

The output REG_OUT of the first register REG is changed to 'B' at the second time point 312. The authentication processing unit 141 checks whether the output REG_OUT of the first register REG is equal to the output REFREG2_OUT of the fourth register at the second time point 312. The output REG_OUT of the first register REG may be maintained as 'B' during a first period T1 of the clock signal CLK.

The output REG_OUT of the first register REG is changed to 'C' at the third time point 313. The authentication processing unit 141 checks whether the output REG_OUT of the first register REG is equal to the output REFREG3_OUT of the fifth register at the third time point 313.

In this example, the sequence of the outputs of the first register REG, which is "A, B, C", is equal to the sequence of the authentication reference values "A, B, C" of the third through fifth registers at the third time point 313. Then, the authentication processing unit 141 may generate the authentication result AR representing success SUCCESS from the third time point 313.

FIG. 5 shows another example operation of the authentication processing unit 141 when the second register REF_REG includes a sequence of authentication reference values. FIG. 5 shows the case that the sequence of the authentication reference values is "A, B, C" and the second register REF_REG includes the third register, the fourth register, and the fifth register. FIG. 5 assumes that an output REFREG1_OUT of the third register is initialized as 'A', which is a first value in the sequence of the authentication reference values, and an output REFREG2_OUT of the fourth register is initialized as 'B', which is a second value in the sequence of the authentication reference values, and an output REFREG3_OUT of the fifth register is initialized as 'C', which is a third value in the sequence of the authentication reference values.

The output REG_OUT of the first register REG is changed to 'A' at the first time point 411. The authentication processing unit 141 checks whether the output REG_OUT of the first register REG is equal to the output REFREG1_OUT of the third register at the first time point 411. The output REG_OUT of the first register REG may be maintained as 'A' during a second period T2 of the clock signal CLK.

The output REG_OUT of the first register REG is changed to 'B' at the second time point 412. The authentication processing unit 141 checks whether the output REG_OUT of the first register REG is equal to the output REFREG2_OUT of the fourth register at the second time point 412. The output REG_OUT of the first register REG may be maintained as 'B' during a second period T2 of the clock signal CLK.

The output REG_OUT of the first register REG is changed to 'C' at the third time point 413. The authentication processing unit 141 checks whether the output REG_OUT of the first register REG is equal to the output REFREG3_OUT of the fifth register at the third time point 413.

In this example, the sequence of the outputs of the first register REG, which is "A, B, C", is equal to the sequence of the authentication reference values "A, B, C" of the third through fifth registers at the third time point 413. Therefore, the authentication processing unit 141 may generate the authentication result AR representing success SUCCESS from the third time point 413.

Figure 6:
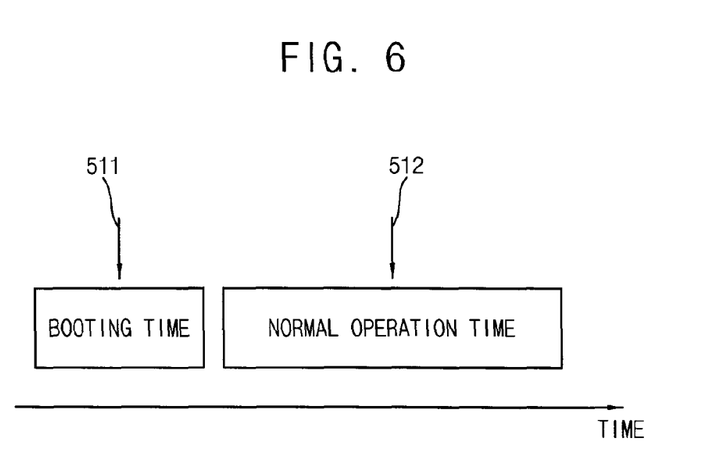
FIGS. 6 through 8 are diagrams illustrating time points when the authentication processing unit included in the timing controller of FIG. 2 performs an authentication procedure.
Figure 7:
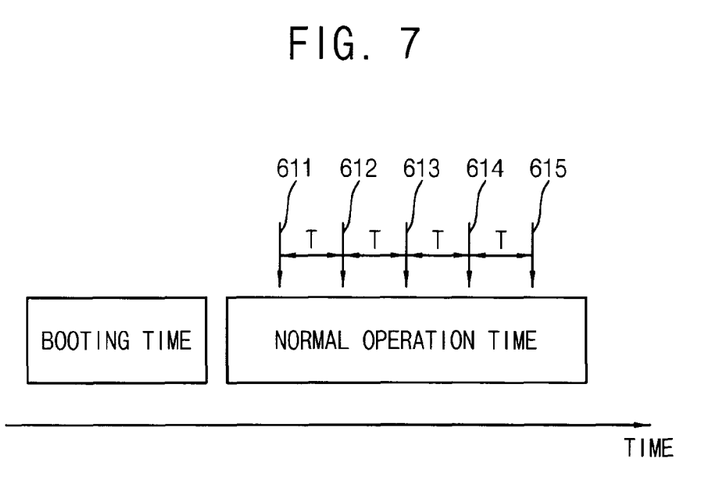
Figure 8:
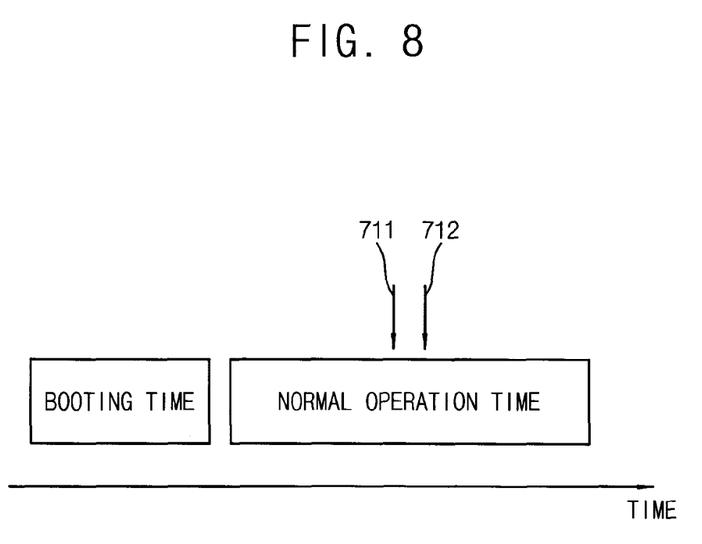

FIGS. 6 through 8 are diagrams illustrating time points when the authentication processing unit included in the timing controller of FIG. 2 performs an authentication procedure.

Referring to FIG. 6, the authentication control signal ACS and the input image data signal RGB of the display device 100 may be generated by an application processor. In an example embodiment, the application processor may insert an authentication reference value or a sequence of authentication reference values to the authentication control signal ACS at a first time point 511 within a booting time BOOTING TIME of operating system (OS). In another example embodiment, the application processor may insert an authentication reference value or a sequence of authentication reference values to the authentication control signal ACS at a second time point 512 within a normal operation time NORMAL OPERATION TIME of the operating system. The normal operation time NORMAL OPERATION TIME may be after the booting time BOOTING TIME.

Referring to FIG. 7, the application processor may insert the authentication reference value or the sequence of the authentication reference values to the authentication control signal ACS during the normal operation time NORMAL OPERATION TIME periodically.

The application processor may insert the authentication reference value or the sequence of the authentication reference values to the authentication control signal ACS in each of first through fifth time points 611, 612, 613, 614, and 615. Interval between neighboring time points among the first through fifth time points 611, 612, 613, 614, and 615 may be a period T.

Referring to FIG. 8, the application processor may insert the authentication reference value or the sequence of the authentication reference values to the authentication control signal ACS at a second time point 712 in the normal operation time NORMAL OPERATION TIME in response to a request of user at a first time point 711 in the normal operation time NORMAL OPERATION TIME.

Figure 9:
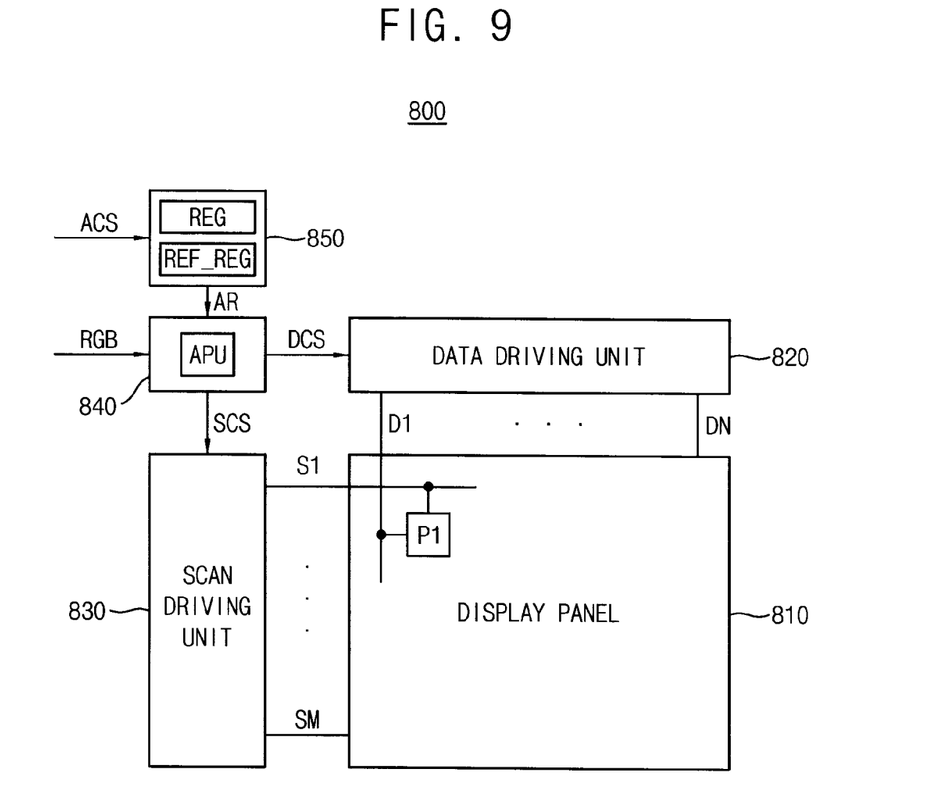
FIG. 9 is a block diagram illustrating display device according to another example embodiment.

FIG. 9 is a block diagram illustrating display device according to another example embodiment.

Referring to FIG. 9, a display device 800 includes an authentication processor 850, a timing controller 840, a display panel 810, a data driver 820, and a scan driver 830.

The authentication processor 850 generates an authentication result AR based on an authentication control signal ACS. The authentication processor 850 may have the same or similar structure with the authentication processing unit 141 included in the timing controller 140 of FIG. 2. The authentication processor 850 may include a first register REG and a second register REF_REG. The first register REF may store the authentication control signal ACS. The second register REF_REG may store an authentication reference value.

The authentication processor 850 may generate the authentication result AR representing success when an output of the first register REG is equal to the authentication reference value. The authentication processor 850 may generate the authentication result AR representing fail when the output of the first register REG is different from the authentication reference value. An application processor may generate the authentication control signal ACS and the input image data signal RGB. Operation of the authentication processor 850 may be understood based on the references to FIGS. 2 through 8.

The timing controller 840 converts an input image data signal RGB to a data driver control signal DCS and a scan driver control signal SCS when the authentication result AR represents success. The timing controller 840 deactivates the data driver control signal DCS and the scan driver control signal SCS when the authentication result AR represents fail. The display panel 810 includes a plurality of pixels P1. The data driver 820 generates a plurality of data signals based on the data driver control signal DCS, and provides the data signals to the pixels P1 through a plurality of data signal lines D1 through DN. The scan driver 830 generates a plurality of scan signals based on the scan driver control signal SCS, and provides the scan signals to the pixels P1 through a plurality of scan signal lines S1 through SM.

Figure 10:
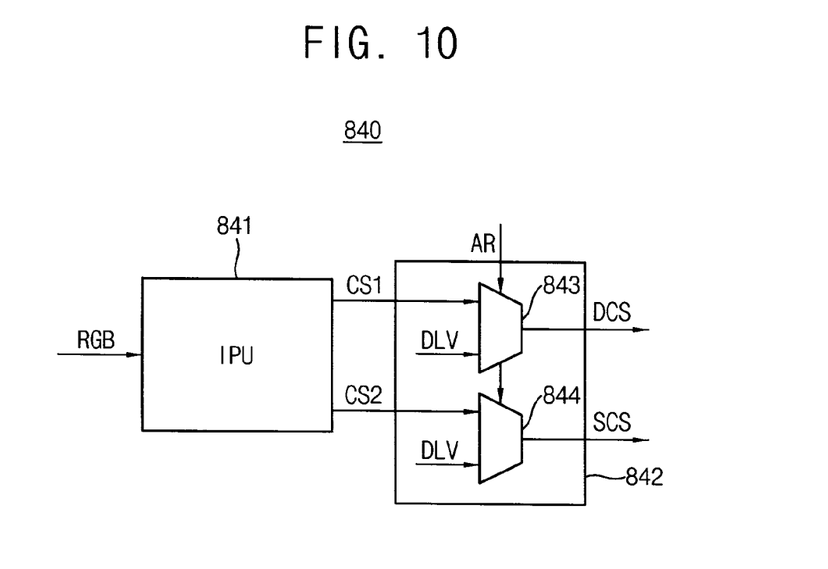
FIG. 10 is a block diagram illustrating the timing controller included in the display device of FIG. 9.

FIG. 10 is a block diagram illustrating the timing controller included in the display device of FIG. 9.

Referring to FIG. 10, the timing controller 840 may include an image processing unit 841 and a switching unit 842.

The image processing unit 841 may output an image result as a first control signal CS1 and a second control signal CS2. The image result may be processed from the input image data signal RGB. The first control signal CS1 may control the data driver 820. The second control signal CS2 may control the scan driver 830. In an example embodiment, the image processing may be a gamma compensation. In another example embodiment, the image processing may be a color gain compensation. In still another example embodiment, the image processing may be a hue compensation.

The switching unit 842 may have a first multiplexer 843 and a second multiplexer 844. The first multiplexer 843 may output the first control signal CS1 or a deactivation logic value DLV as the data driver control signal DCS in response to the authentication result AR. The second multiplexer 844 may output the second control signal CS2 or the deactivation logic value DLV as the scan driver control signal SCS in response to the authentication result AR. In an example embodiment, the deactivation logic level DLV may be a logical value 0. In another example embodiment, the deactivation logic level DLV may be a logical value 1.

In detail, the first control signal CS1 and a deactivation logic value DLV are input to the first multiplexer 843, and the first multiplexer 843 may output the first control signal CS1 as the data driver control signal DCS when the authentication result AR represents success. The first multiplexer 843 may output the deactivation logic value DLV as the data driver control signal DCS when the authentication result AR represents fail. The second control signal CS2 and a deactivation logic value DLV are input to the second multiplexer 844, and the second multiplexer 844 may output the second control signal CS2 as the scan driver control signal SCS when the authentication result AR represents success. The second multiplexer 844 may output the deactivation logic value DLV as the scan driver control signal SCS when the authentication result AR represents fail.

Figure 11:
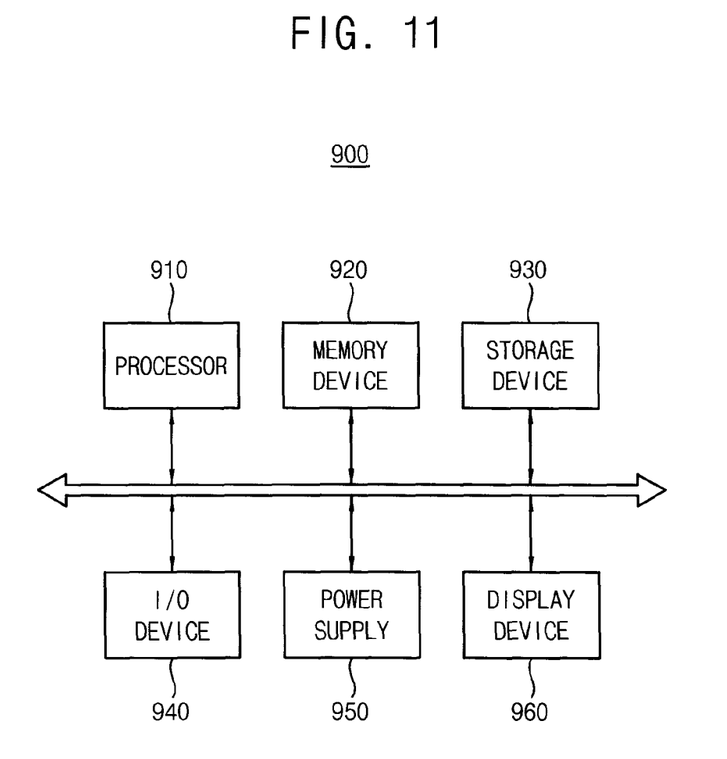
FIG. 11 is a block diagram illustrating an electronic device according to an example embodiment.

FIG. 11 is a block diagram illustrating an electronic device according to an example embodiment.

Referring to FIG. 11, an electronic device 900 may include a processor 910, a memory device 920, a storage device 930, an input/output (I/O) device 940, a power supply 950, and a display device 960. Here, the electronic device 900 may further include a plurality of ports for communicating a video card, a sound card, a memory card, a universal serial bus (USB) device, other electronic devices, etc. Although the electronic device 900 is implemented as a smart-phone, a kind of the electronic device 900 is not limited thereto.

The processor 910 may perform various computing functions. The processor 910 may be a micro processor, a central processing unit (CPU), etc. The processor 910 may be coupled to other components via an address bus, a control bus, a data bus, etc. Further, the processor 910 may be coupled to an extended bus such as a peripheral component interconnection (PCI) bus. The processor 910 may be the application processor which generates the authentication control signal ACS and the input image data signal RGB of the display device 100 of FIG. 1. The processor 910 may be the application processor which generates the authentication control signal ACS and the input image data signal RGB of the display device 800 of FIG. 9. The processor 910 may be the application processor included in the claims 7 through 11.

The memory device 920 may store data for operations of the electronic device 900. For example, the memory device 920 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile DRAM device, etc.

The storage device 930 may be a solid state drive (SSD) device, a hard disk drive (HDD) device, a CD-ROM device, etc. The I/O device 940 may be an input device such as a keyboard, a keypad, a touchpad, a touch-screen, a mouse, etc, and an output device such as a printer, a speaker, etc. The power supply 950 may provide a power for operations of the electronic device 900. The display device 960 may communicate with other components via the buses or other communication links.

The display device 960 may be implemented as one of the display devices 100 and 800 of FIGS. 1 and 9. The display device 960 may be understood based on the references to FIGS. 1 through 10.

The example embodiments may be applied to any electronic system 900 having the display device 960. For example, the present embodiments may be applied to the electronic system 900, such as a digital or 3D television, a computer monitor, a home appliance, a laptop, a digital camera, a cellular phone, a smart phone, a personal digital assistant (PDA), a portable multimedia player (PMP), a MP3 player, a portable game consol, a navigation system, a video phone, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:
1. A display device comprising:
   a display panel including a plurality of pixels that display an image;
   a timing controller coupled to the display panel, the timing controller activating or deactivating the display panel, the timing controller comprising:
      a first register to store an authentication control signal;
      a second register to store an authentication reference value;

a first multiplexer receiving a deactivation logic value and a first control signal, and outputting a data driver control signal that includes the deactivation logic value or the first control signal; and a second multiplexer receiving the deactivation logic value and a second control signal, and outputting a scan driver control signal that includes the deactivation logic value or the second control signal;

a data driver coupled to the timing controller and the display panel, the data driver receiving the data driver control signal from the first multiplexer and generating a plurality of data signals from the data driver control signal to drive the display panel, the data driver not driving the display panel if the data driver control signal includes the deactivation logic value; and a scan driver coupled to the timing controller and the display panel, the scan driver receiving the scan driver control signal from the second multiplexer and generating a plurality of scan signals from the scan driver control signal to drive the display panel, the scan driver not driving the display panel if the scan driver control signal includes the deactivation logic value, the timing controller performing operations, comprising:

converting an input image data to the first control signal and the second control signal;

receiving the authentication control signal and storing the authentication control signal in the first register;

comparing the authentication control signal with the authentication reference value;

generating an authentication result representing a success if the authentication control signal stored in the first register is equal to the authentication reference value;

generating the authentication result representing a failure if the authentication control signal stored in the first register is different from the authentication reference value;

controlling the first multiplexer to output the first control signal if the authentication result represents the success, and to output the deactivation logic value if the authentication result represents the failure; and controlling the second multiplexer to output the second control signal if the authentication result represents the success, and to output the deactivation logic value if the authentication result represents the failure.

2. A display device comprising:

a display panel including a plurality of pixels that display an image;

a timing controller coupled to the display panel, the timing controller activating or deactivating the display panel, the timing controller comprising:
  a first register to store an authentication control signal;
  a second register to store an authentication reference value;
  a third register to store another authentication reference value;
  a first multiplexer receiving a deactivation logic value and a first control signal, and outputting a data driver control signal that includes the deactivation logic value or the first control signal; and
  a second multiplexer receiving the deactivation logic value and a second control signal, and outputting a scan driver control signal that includes the deactivation logic value or the second control signal;

a data driver coupled to the timing controller and the display panel, the data driver receiving the data driver control signal from the first multiplexer and generating a plurality of data signals from the data driver control signal to drive the display panel, the data driver not driving the display panel if the data driver control signal includes the deactivation logic value; and a scan driver coupled to the timing controller and the display panel, the scan driver receiving the scan driver control signal from the second multiplexer and generating a plurality of scan signals from the scan driver control signal to drive the display panel, the scan driver not driving the display panel if the scan driver control signal includes the deactivation logic value, the timing controller performing operations, comprising:

converting an input image data to the first control signal and the second control signal;

receiving the authentication control signal and storing the authentication control signal in the first register at a first time point;

receiving the authentication control signal and storing the authentication control signal in the first register at a second time point that follows the first time point;

comparing the authentication control signal with the authentication reference value and with said another authentication reference value;

generating an authentication result representing a success if the authentication control signal stored in the first register at the first time point is equal to the authentication reference value and if the authentication control signal stored in the first register at the second time point is equal to said another authentication reference value, otherwise generating the authentication result representing a failure;

controlling the first multiplexer to output the first control signal if the authentication result represents the success, and to output the deactivation logic value if the authentication result represents the failure; and controlling the second multiplexer to output the second control signal if the authentication result represents the success, and to output the deactivation logic value if the authentication result represents the failure.

3. An electronic device comprising:

an application processor to generate an authentication control signal and an input image data signal; and a display device to display an image corresponding to the input image data signal, the display device comprising:
  a display panel including a plurality of pixels that display an image;
  a timing controller coupled to the display panel, the timing controller activating or deactivating the display panel, the timing controller comprising:
    a first register to store an authentication control signal;
    a second register to store an authentication reference value;
    a first multiplexer receiving a deactivation logic value and a first control signal, and outputting a data driver control signal that includes the deactivation logic value or the first control signal; and
    a second multiplexer receiving the deactivation logic value and a second control signal, and outputting a scan driver control signal that includes the deactivation logic value or the second control signal;

a data driver coupled to the timing controller and the display panel, the data driver receiving the data driver control signal from the first multiplexer and generating a plurality of data signals from the data driver control signal to drive the display panel, the data driver not driving the display panel if the data driver control signal includes the deactivation logic value; and a scan driver coupled to the timing controller and the display panel, the scan driver receiving the scan driver control signal from the second multiplexer and generating a plurality of scan signals from the scan driver control signal to drive the display panel, the scan driver not driving the display panel if the scan driver control signal includes the deactivation logic value, the timing controller performing operations, comprising:

converting an input image data to the first control signal and the second control signal;

receiving the authentication control signal and storing the authentication control signal in the first register;

comparing the authentication control signal with the authentication reference value;

generating an authentication result representing a success if the authentication control signal stored in the first register is equal to the authentication reference value;

generating the authentication result representing a failure if the authentication control signal stored in the first register is different from the authentication reference value;

controlling the first multiplexer to output the first control signal if the authentication result represents the success, and to output the deactivation logic value if the authentication result represents the failure; and controlling the second multiplexer to output the second control signal if the authentication result represents the success, and to output the deactivation logic value if the authentication result represents the failure.

4. The electronic device of claim 3, wherein the application processor inserts the authentication reference value to the authentication control signal during a booting operation of an operating system.

5. The electronic device of claim 3, wherein the application processor inserts the authentication reference value to the authentication control signal during a normal operation of an operating system and the normal operation is after a booting operation of the operating system.

6. The electronic device of claim 5, wherein the application processor inserts the authentication reference value to the authentication control signal during the normal operation periodically.

7. The electronic device of claim 5, wherein the application processor inserts the authentication reference value to the authentication control signal during the normal operation in response to a request of user.

* * * * *